(12) United States Patent
Dykstra et al.

(10) Patent No.: US 10,901,377 B2
(45) Date of Patent: Jan. 26, 2021

(54) REAL-TIME CONTROL OF DRILLING FLUID PROPERTIES USING PREDICTIVE MODELS

(71) Applicant: HALLIBURTON ENERGY SERVICES, INC., Houston, TX (US)

(72) Inventors: Jason D. Dykstra, Spring, TX (US); Zhijie Sun, Spring, TX (US); Yuzhen Xue, Humble, TX (US); Fanping Bu, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 673 days.

(21) Appl. No.: 15/527,652

(22) PCT Filed: Dec. 31, 2014

(86) PCT No.: PCT/US2014/073051
§ 371 (c)(1),
(2) Date: May 17, 2017

(87) PCT Pub. No.: WO2016/108908
PCT Pub. Date: Jul. 7, 2016

(65) Prior Publication Data
US 2017/0343969 A1   Nov. 30, 2017

(51) Int. Cl.
*G05B 13/04* (2006.01)
*E21B 21/06* (2006.01)
(Continued)

(52) U.S. Cl.
CPC .......... *G05B 13/042* (2013.01); *E21B 21/06* (2013.01); *E21B 21/08* (2013.01); *E21B 44/00* (2013.01); *E21B 44/005* (2013.01)

(58) Field of Classification Search
CPC .......... E21B 21/06; E21B 21/08; E21B 44/00; E21B 44/005; G05B 13/042
See application file for complete search history.

(56) References Cited

U.S. PATENT DOCUMENTS

| 6,176,323 B1 | 1/2001 | Weirich et al. |
| 2002/0096363 A1 | 7/2002 | Evans et al. |

(Continued)

FOREIGN PATENT DOCUMENTS

| EP | 0211112 A1 | 2/1897 |
| WO | 2011095600 A2 | 8/2011 |

OTHER PUBLICATIONS

International Search Report and Written Opinion; PCT Application No. PCT/US2014/073051; dated Sep. 1, 2015.

*Primary Examiner* — Roy Y Yi
*Assistant Examiner* — Geoffrey T Evans
(74) *Attorney, Agent, or Firm* — Polsinelli PC

(57) ABSTRACT

A method for controlling drilling fluid properties, in some embodiments, comprises determining a predictive model for a fluid circulation system that routes drilling fluid downhole to a drill bit to remove debris from said drill bit; determining a cost function associated with the fluid circulation system; using the predictive model and the cost function to determine a set of input values for the predictive model; operating a controlled device according to at least some of the set of input values, said controlled device changes properties of the drilling fluid in the fluid circulation system; and obtaining measurements of the properties.

16 Claims, 3 Drawing Sheets

(51) Int. Cl.
*E21B 44/00* (2006.01)
*E21B 21/08* (2006.01)

(56) References Cited

U.S. PATENT DOCUMENTS

| | | | |
|---|---|---|---|
| 2003/0209364 A1 | 11/2003 | Rezgui et al. | |
| 2011/0214878 A1* | 9/2011 | Bailey | E21B 7/00 |
| | | | 166/369 |
| 2011/0276187 A1* | 11/2011 | Ciglenec | E21B 49/10 |
| | | | 700/282 |
| 2015/0369957 A1* | 12/2015 | Cig | E21B 49/00 |
| | | | 702/12 |
| 2016/0209536 A1* | 7/2016 | Song | E21B 47/14 |
| 2017/0275981 A1* | 9/2017 | Coudroy | G01F 15/08 |
| 2017/0276529 A1* | 9/2017 | Coudroy | G01F 7/005 |

* cited by examiner

REAL-TIME CONTROL OF DRILLING FLUID PROPERTIES USING PREDICTIVE MODELS

CROSS-REFERENCE TO RELATED APPLICATIONS

This application is a national stage entry of PCT/US2014/073051 filed Dec. 31, 2014, said application is expressly incorporated herein in its entirety.

BACKGROUND

The physical properties of drilling fluids significantly affect drilling operations. These properties, such as density and viscosity, have a direct impact on downhole pressures and the ability of drilling fluid to carry formation cuttings back to the surface. The physical properties of drilling fluid can be manipulated by mixing various chemical additives into the fluid at the surface to achieve optimal fluid composition for efficient debris removal.

Such chemicals, however, are typically added to the fluid by a human operator—an imprecise technique that often entails the addition of chemicals at unintended ratios or times. Automated chemical additive systems exist, but these systems are ill-equipped to account for the delay between the time that chemicals are added and the time that the fluid's properties begin to change and thus entail significant uncertainty in determining the type, quantity and timing of chemicals to be added to the fluid. The result of these problems is a sub-optimal fluid composition that removes debris inefficiently.

BRIEF DESCRIPTION OF THE DRAWINGS

Accordingly, there are disclosed in the drawings and in the following description specific methods and systems for the real-time control of drilling fluid properties using predictive models. In the drawings.

Figure 1:
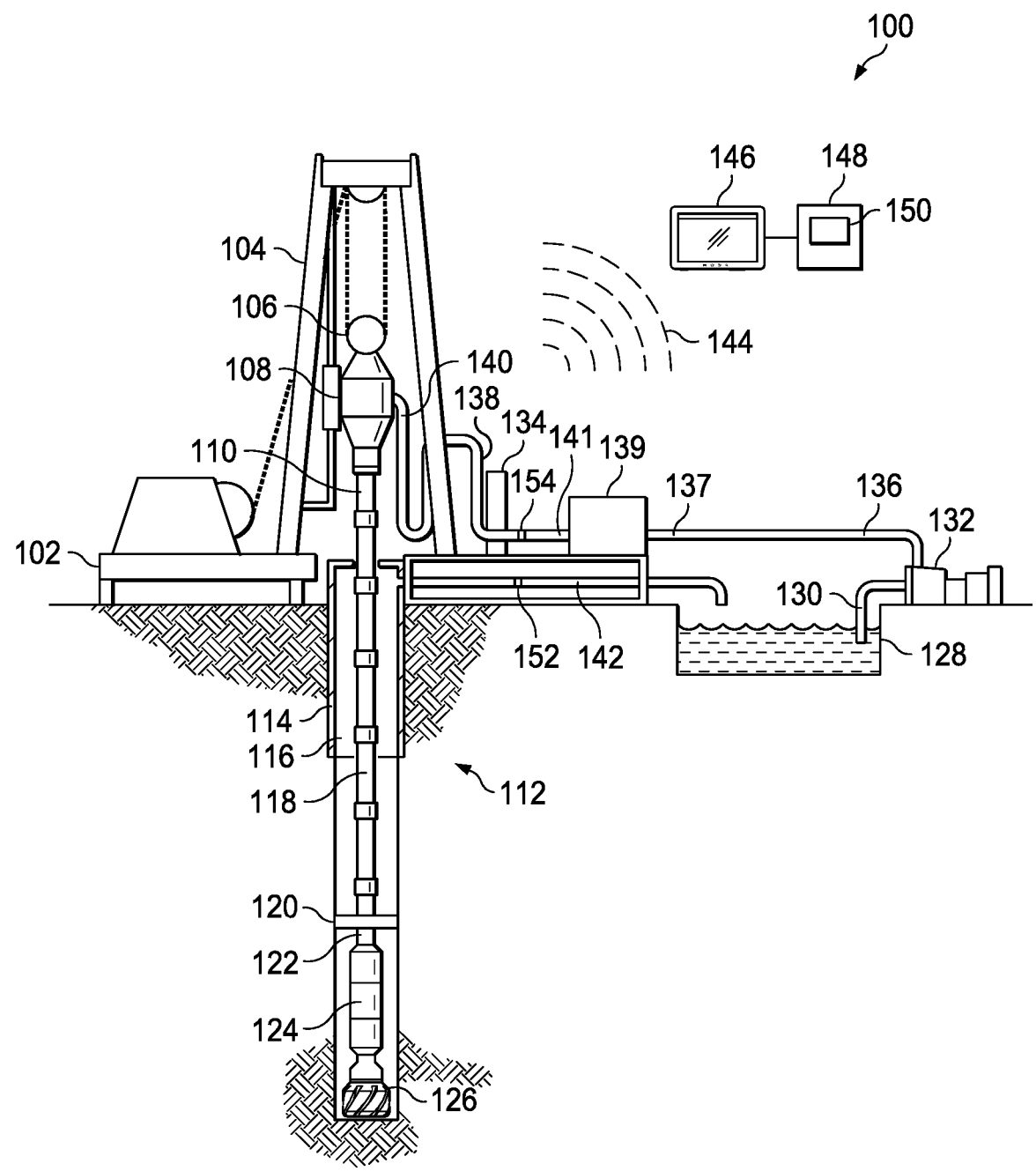
FIG. 1 is a schematic of an illustrative drilling operation.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for the real-time control of drilling fluid properties using predictive modeling. Generally, the technique described below entails determining a predictive model and cost function for a fluid circulation system. A set of input values is determined for the predictive model that produces a set of output values that minimizes the cost function. The input values reflect the amount of each type of chemical to be added to the drilling fluid, and they also reflect a pump rate at which the fluid is to be moved in the fluid circulation system. A controlled device (e.g., a chemical additive apparatus, a pump) is then operated in accordance with at least some of the set of input values, thereby causing the controlled device to release chemicals into the fluid circulation system in accordance with the input values and causing the pump to pump at a rate specified by the set of input values. After a predetermined amount of time, measurements (e.g., fluid density, viscosity) are obtained and are compared against the values that were predicted using the predictive model. The comparison is used to update the predictive model, and the process is then repeated. Over time, the predictive model is repeatedly updated and closely reflects the behavior of the fluid circulation system. Accordingly, it can be used to quickly and precisely predict the impact that certain inputs to the chemical additive apparatus and pump will have on fluid composition, thereby enabling the real-time control of drilling fluid properties.

FIG. 1 is a schematic of an illustrative drilling environment 100. The drilling environment 100 comprises a drilling platform 102 that supports a derrick 104 having a traveling block 106 for raising and lowering a drill string 118. A top-drive motor 108 supports and turns the drill string 118 via a kelly 110 as it is lowered into a borehole 112. The drill string's rotation, alone or in combination with the operation of a downhole motor, drives the drill bit 126 to extend the borehole 112. The drill bit 126 is one component of a bottomhole assembly (BHA) 122 that may further include a rotary steering system (RSS) 124 and stabilizer 120 (or some other form of steering assembly) along with drill collars and logging instruments. While drilling, an upper portion of the borehole 112 may be stabilized with a casing string 114 while a lower portion of the borehole 112 remains open (uncased).

The drill collars in the BHA 116 are typically thick-walled steel pipe sections that provide weight and rigidity for the drilling process. The BHA 116 typically includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 122 physically returns to the surface.

A surface interface 134 serves as a hub for communicating via the telemetry link and for communicating with the various sensors and control mechanisms on the platform 102. A data processing unit 146 (shown in FIG. 1 as a tablet computer) communicates with the surface interface 134 via a wired or wireless link 144, collecting and processing measurement data to generate logs and other visual representations of the acquired data and the derived models to facilitate analysis by a user. The data processing unit 146 may take many suitable forms, including one or more of: an embedded processor, a desktop computer, a laptop computer, a central processing facility, and a virtual computer in the cloud. In each case, software on a non-transitory information storage medium (e.g., stored within the processing unit 146) may cause the processing unit to carry out the desired processing, modeling, and display generation. The data processing unit may also contain storage to store, e.g., data received from tools in the BHA 122 via mud pulse telemetry or any other suitable communication technique. The scope of disclosure is not limited to these particular examples of data processing units.

The drilling environment 100 includes a fluid circulation system. One purpose of the fluid circulation system is to pump fluid downhole to the drill bit so that debris (e.g., rock cuttings produced by the penetration of the drill bit 126 into the formation) can be flushed away from the vicinity of the drill bit and so that the drill bit can be cooled to ensure optimal function. To this end, a pump 132 pumps drilling fluid through a pump discharge line 136, a chemical additive apparatus (CAA) 139 (which couples to input line 137 and output line 141), a standpipe 138, and a rotary hose 140 to the top drive 108, downhole through the interior of the kelly 110 and the drill string 118, through orifices in the drill bit 126, back to the surface via an annulus 116 around the drill string 118, through a return flow line 142, and into a retention pit 128. The drilling fluid transports formation samples—i.e., drill cuttings—from the borehole 112 into the retention pit 128 and aids in maintaining the integrity of the borehole. Formation samples may be extracted from the drilling fluid at any suitable time and location, such as from the retention pit 128. The formation samples may then be analyzed at a suitable surface-level laboratory or other facility (not specifically shown). A pump suction line 130 is used to draw fluid from the retention pit 128 to the pump 132. As the technique described herein monitors and controls aspects of the fluid circulation system, the technique may be encoded as software stored on storage in communication with the data processing unit 146 (e.g., within the unit 146 or as storage 148 comprising software code 150). The data processing unit 146 may control settings (e.g., torque and speed) of the pump 132 by communicating with the surface interface 134, which, in turn, controls the pump 132. The surface interface 134 also couples to and communicates with the CAA 139 and to fluid measurement devices 152, 154 coupled to the return flow line 142 and output line 141, respectively. Each of the fluid measurement devices 152, 154 is able to measure various properties of the drilling fluid, such as—without limitation—fluid density and viscosity. Thus, because the data processing unit 146 is in communication with the CAA 139 and fluid measurement devices 152, 154 via the surface interface 134, the data processing unit 146 is able to control the CAA 139 (e.g., the types, amounts, times, rates, etc. of chemicals to be added to the drilling fluid) and is further able to cause the fluid measurement devices 152, 154 to perform measurements and to obtain the measurements from the measurement devices for further processing. The scope of disclosure is not limited to the precise fluid circulation system architecture shown in FIG. 1. In some embodiments, for instance, the fluid measurement devices 152, 154 may be located along other portions of the fluid circulation system. Additional fluid measurement devices may be deployed, as well.

Figure 2:
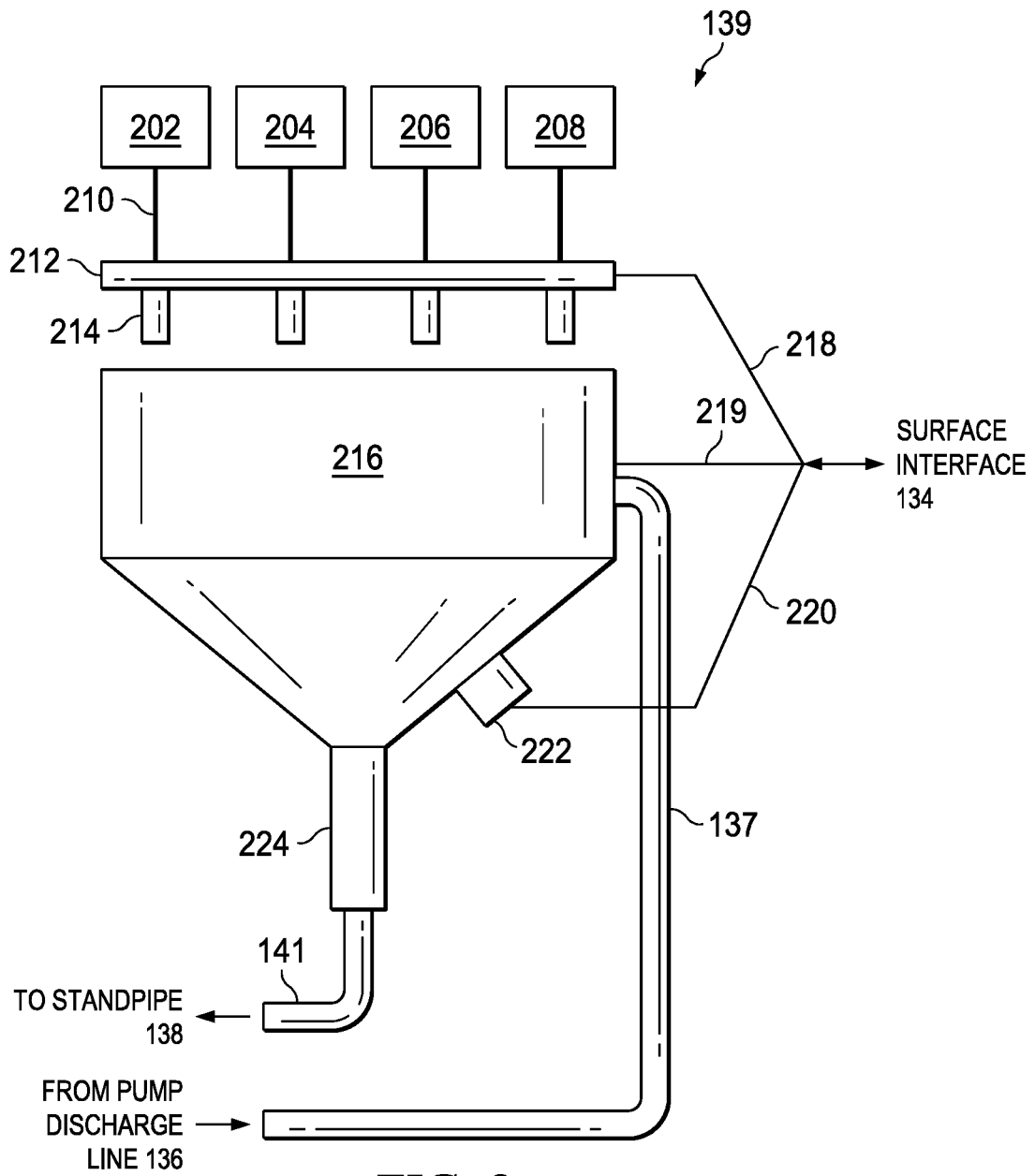
FIG. 2 is a schematic of a drilling fluid chemical additive apparatus.

FIG. 2 is a schematic of the chemical additive apparatus (CAA) 139 of FIG. 1. The CAA 139 includes chemical additive containers 202, 204, 206 and 208. Any chemicals suitable for addition to drilling fluid may be stored in these containers, at the discretion of drilling personnel. Chemicals stored in the containers 202, 204, 206, 208 are supplied to the valve unit 212 via conduits 210. The valve unit 212, which is controlled by the surface interface 134 (and, by extension, the processing unit 146; numeral 218), contains multiple valves 214 that regulate the amount of each chemical that is permitted to enter a blender 216. The valves 214 are controlled individually, meaning that the processing unit 146 may adjust the valves 214 so that the contents of one of the chemical additive containers is permitted into the blender 216 while the contents of another one of the chemical additive containers is precluded from entering the blender 216. Further, of the valves that are open, different valves may permit chemicals to pass through at different throughput rates. For instance, the valve 214 corresponding to container 202 may be fully open, permitting a fast throughput into the blender 216; the valves 214 corresponding to containers 204 and 206 may be 25% and 75% open, respectively, thereby permitting relatively slower and faster throughput rates into the blender 216; and the valve 214 corresponding to container 208 may be shut off entirely. Further still, in some embodiments, the processing unit 146 causes each of the valves 214 to open and close at different times and to different degrees. Any and all such variations fall within the scope of this disclosure.

The blender 216 is controlled by the surface interface 134 (and, by extension, the processing unit 146; numeral 219) and blends its contents in any suitable fashion. In some embodiments, for instance, the blender 216 may include an agitator or other similar apparatus to blend the chemicals into a mixture. In some embodiments, the blender 216 blends its contents continuously, and in other embodiments, the blender 216 blends its contents intermittently as the processing unit 146 may instruct. The blender's contents include chemicals added from the containers 202, 204, 206, and 208, as well as the drilling fluid that is provided to the blender 216 via the input line 137. The blended mixture that the blender 216 produces is output from the blender via output line 141. The rate at which the blended mixture is output to the output line 141 depends on the degree to which a valve 224 is open. The valve 224 is controlled by a valve controller 222, which, in turn, is controlled by the surface interface 134 (and, by extension, the processing unit 146). As with the valves 214, the valve 224 may be controlled by the processing unit 146 in any suitable fashion, with any and all variations with respect to valve timing, aperture and throughput falling within the scope of this disclosure. Also contemplated is a chemical additive apparatus in which containers 202, 204, 206, 208, conduits 210, valve unit 212 and valves 214 are replaced by multiple containers that contain sacks of chemicals and one or more processing-unit-controlled cutting devices that cut open the sacks so that the contents may be added to the blender 216. In such embodiments, the types of chemicals and the rates at which they are mixed with the drilling fluid in the blender 216 may be controlled by the processing unit 146 in a manner similar to that in which the processing unit 146 controls the CAA 139.

Figure 3:
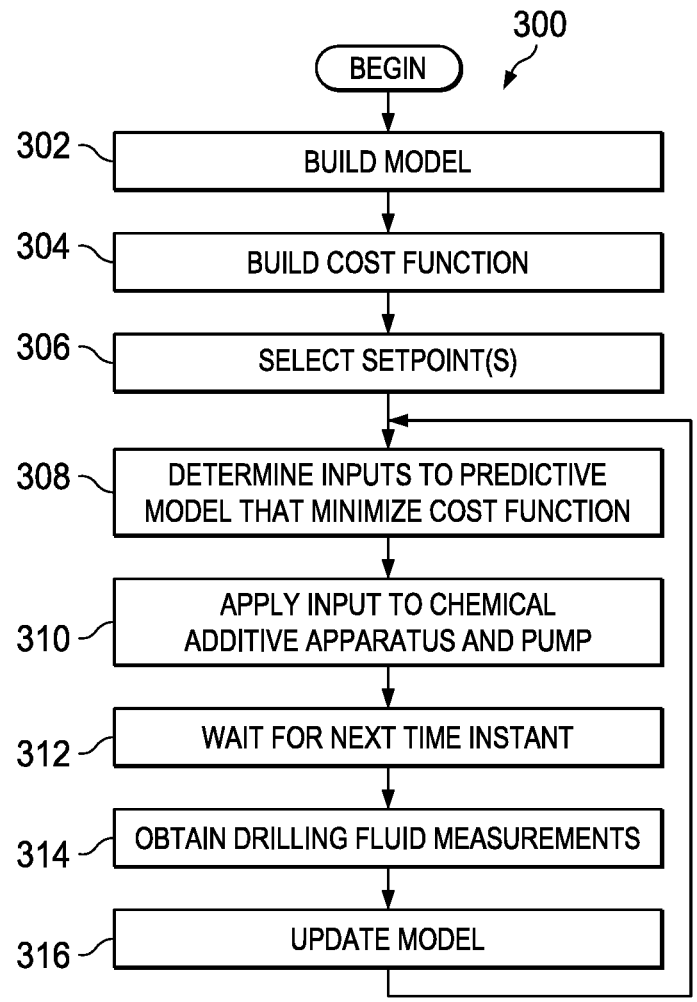
FIG. 3 is a flow diagram of a method describing the development of a predictive model usable to control drilling fluid properties in real time.

The technique for controlling drilling fluid properties in real time is now disclosed with respect to the flow diagram of FIG. 3. The steps described below with respect to FIG. 3 are, in at least some embodiments, encoded in software 150 that is stored on storage 148 and executed by processing unit 146 (FIG. 1). The processing unit 146, in turn, communicates with the surface interface 134 and causes the surface interface 134 to interact with various devices in the system 100 (FIG. 1). These devices include the pump 132, the CAA 139 (e.g., the valve unit 212 and valves 214, blender 216, and valve 224), and fluid measurement devices 152, 154 (FIGS. 1 and 2). Data obtained from some of these devices—such as the fluid measurement devices 152, 154—is provided to the surface interface 134, which, in turn, provides the data to the processing unit 146 so that the data may be analyzed and further actions may be taken in accordance with the technique described in FIG. 3.

Referring primarily now to FIG. 3 and occasionally to FIGS. 1 and 2, the method 300 begins with determining a predictive model representing the fluid circulation system and, more specifically, the composition of drilling fluid in the system (step 302). Although the scope of disclosure is not limited to any particular type of model, in some embodiments, an appropriate model includes a multiplication of two matrices: one matrix that includes input values that describe the amount of each chemical to be added to the drilling fluid at a given instant in time as well as a pump rate being used by the pump at that time, and a second matrix that includes multiple transfer functions describing the behavior of the fluid circulation system. The two matrices are multiplied to produce a product matrix. The product matrix includes a plurality of output values that describe the measurements of the fluid in the fluid circulation system. In some embodiments, these output value measurements are fluid density and viscosity, and output values may include density and viscosity measurements in multiple locations in the fluid circulation system. In some embodiments, the transfer functions are differential equations and each differential equation has its own initial condition associated with the output value measurements. For example, the initial conditions may be set to equal or approximate density and viscosity measurements obtained from the fluid.

An illustrative predictive model is as follows:

$$\begin{bmatrix} y_1 \\ \vdots \\ y_n \end{bmatrix} = \begin{bmatrix} G_{11} & \cdots & G_{1m} & G_{1V} \\ \vdots & \ddots & \vdots & \vdots \\ G_{n1} & \cdots & G_{nm} & G_{nV} \end{bmatrix} \begin{bmatrix} u_1 \\ \vdots \\ u_m \\ V \end{bmatrix} \quad (1)$$

where $y_1, \ldots, y_n$ are the n measurements obtained from the drilling fluid; $u_1, \ldots, u_m$ are the m inputs into the predictive model denoting how much of each chemical in the containers 202, 204, 206, 208 (FIG. 2) is to be released into the blender 216; V is an input value denoting the pump rate at which the pump 132 (FIG. 1) operates; $G_{11}, \ldots, G_{nm}$ are transfer functions describing how each of the chemicals denoted in $u_1, \ldots, u_m$ affects the drilling fluid measurements $y_1, \ldots, y_n$; and $G_{1V}, \ldots, G_{nV}$ represents how the pump rate affects the measurements. The transfer functions $G_{11}, \ldots, G_{nm}$ are dynamic models in that they include the delay between the time that the blended chemical mixture is added to the fluid (e.g., by the blender 216 in FIG. 2) and the time that the measured properties of the fluid change. More particularly, in at least some embodiments, the transfer functions $G_{11}, \ldots, G_{nm}$ include the transient states of fluid composition that exist between the time that the blended chemical mixture is added to the drilling fluid and the time that the drilling fluid reaches a steady-state composition (and, thus, steady-state measurements of density and viscosity). The scope of this disclosure is not limited to the specific predictive model described in equation (1). Any suitable predictive model that describes the behavior of the fluid circulation system (and, in particular, the drilling fluid) in response to a particular chemical mixture and pump rate (and any other suitable inputs) may be used. The model may be derived from physical laws, from lab test experimental data, or both.

The method 300 next includes determining a cost function associated with the fluid circulation system (step 302). A cost function is a mathematical expression including several cost terms, each of which is to be minimized. For example, a cost function may include terms relating to environmental impact, energy consumption, and a difference between a particular parameter and a predetermined setpoint for that parameter. When each of these terms is minimized, the overall "cost" is minimized. Any condition that facilitates the realization of a minimized cost function is deemed desirable, at least in terms of cost. An illustrative cost function is as follows:

$$\min \Sigma_{i=k}^{k+N} W_1(y_1(i)-v_{1,sp})^2 + W_2(y_2(i)-\rho_{1,sp})^2 + W_3(y_3(i)-v_{2,sp})^2 + W_4(y_4(i)-\rho_{2,sp})^2 + W_5 \cdot \text{energy}(i) + W_6 (\text{ECD}(i)-\text{ECD}_{sp})^2 \quad (2)$$

where k is the current time; N is the prediction horizon that determines the length of time for which the method 300 will perform predictions and is set to be long enough to include the dynamics of the fluid circulation system; $y_1$ is the viscosity of the drilling fluid at the fluid measurement device 152; $y_2$ is the density of the drilling fluid at the fluid measurement device 152; $y_3$ is the viscosity of the drilling fluid at the fluid measurement device 154; $y_4$ is the density of the drilling fluid at the fluid measurement device 154; $v_{1,sp}$ is the setpoint for the fluid viscosity at device 152; $\rho_{1,sp}$ is the setpoint for the fluid density at device 152; $v_{2,sp}$ is the setpoint for the fluid viscosity at device 154; $\rho_{2,sp}$ is the setpoint for the fluid density at device 154; energy(i) is the predicted energy consumption; ECD(i) is the predicted equivalent circulating density; $\text{ECD}_{sp}$ is the setpoint for ECD(i); and W1-W6 are weights that are applied to each of the terms in the cost function. As described below, values for $y_1$-$y_4$ are determined using the predictive model (equation (1)) that minimize the cost function over a time period N, as the summation symbol in equation (2) indicates. The cost function is calculated over the time period N so that the long-term costs can be determined for a particular input value. The weights W1-W6 are determined based on the desired weight for each of the terms in the cost function. For instance, weights W1-W4 may be increased to emphasize the setpoint tracking terms, thereby more quickly achieving values for $y_1$-$y_4$ that match or closely approximate the setpoints. In another instance, weights W1-W4 may be decreased and/or the weight W5 increased if the values for $y_1$-$y_4$ already closely approximate the setpoints, thereby emphasizing economy over setpoint tracking. In yet another instance, if the difference between the gradients of pore pressure and fracture pressure is below a predetermined threshold, ECD must be carefully controlled and thus W4 may be increased. The scope of disclosure is not limited to this particular cost function, and the precise terms used in the cost function built at step 304 may vary.

The method 300 next entails selecting setpoints for use in the cost function (step 306). Setpoints may be selected in any suitable manner. In some embodiments, they are based on any of a variety of data and objectives that drilling personnel may have. In some embodiments, the setpoints are determined using an optimization technique. Although the setpoints are determined at step 306, for ease and clarity of explanation, the manner in which they are determined is described further below in this document.

The method 300 then includes determining inputs to the predictive model that minimizes the cost function and that meets any additional constraints that personnel may wish to apply (step 308). Referring to equations (1) and (2), in at least some embodiments, this step entails the use of software (e.g., MICROSOFT EXCEL® or MATHWORKS MATLAB®) to determine a set of inputs $u_1 \ldots u_m$, V for times k . . . k+N that produces outputs $y_1 \ldots y_n$ for times k . . . k+N using the predictive model (equation (1)) that, in turn, reflect desired measurement values, minimize the cost function (equation (2)), and satisfy any other constraints that may be imposed.

More specifically, the software determines one set of input values $u_1 \ldots u_m$, V for time k, another set of input values $u_1 \ldots u_m$, V for time k+1, and additional sets of input values $u_1 \ldots u_m$, V for each time k+2 ... k+N. Each of these sets of inputs is input into the predictive model (equation (1)) to determine a set of output values $y_1 \ldots y_n$ for time k, another set of output values $y_1 \ldots y_n$ for time k+1, and additional sets of output values $y_1 \ldots y_n$ for each time k+2 ... k+N. Thus, a set of input values to $u_1 \ldots u_m$, V is determined for each time k ... k+N, and a set of corresponding output values $y_1 \ldots y_n$ is determined for each time k ... k+N.

Next, the sets of output values $y_1 \ldots y_n$ are used to calculate the cost function. The calculation for the cost function for time k (i.e., the current time) is performed using the actual measurement values obtained from fluid measurement devices 152, 154 at time k. The remaining calculations for the cost function for times k+1 ... k+N, however, are performed using the corresponding values $y_1 \ldots y_n$ calculated for times k+1 ... k+N, since these values are future time values that cannot be measured at time k. The calculations for all times k ... k+N are then summed to produce a value that reflects the total cost associated with the input values $u_1 \ldots u_m$, V that were used to calculate using the predictive model. The set of input values $u_1 \ldots u_m$, V that produces the desired measurements in the predictive model, produces the lowest cost function value, and that meets any other imposed constraints is selected as the set of input values $u_1 \ldots u_m$, V that ultimately results from the step 308.

The input values $u_1 \ldots u_m$, V that ultimately result from step 308, however, must satisfy any additional constraints that are imposed. The constraints may be imposed by a variety of sources, including physical restrictions (e.g., mud tank size) and personnel decisions. In some embodiments, illustrative constraints may include the following:

$$L(i) = f_1(u_1, \ldots, u_m, V, y_1, \ldots, y_n)$$

$$p(i) = f_2(u_1, \ldots, u_m, V, y_1, \ldots, y_n)$$

$$\text{energy}(i) = f_3(u_1, \ldots, u_m, V, y_1, \ldots, y_n)$$

$$ECD(i) = f_4(u_1, \ldots, u_m, V, y_1, \ldots, y_n)$$

$$0 \leq u_1(i) \leq u_{1,max}$$

$$\vdots$$

$$0 \leq u_m(i) \leq u_{m,max}$$

$$0 \leq V \leq V_{max}$$

$$0 \leq L(i) \leq L_{max}$$

$$0 \leq p(i) \leq p_{max}$$

$$\text{for all } i = k, k+1, \ldots, k+N$$

where L(i) is the predicted mud tank level at time i, p(i) is the pipeline pressure at time i, and $u_{1,max}$, $u_{m,max}$, $V_{max}$, $L_{max}$ and $p_{max}$ are determined by any suitable means. Further, functions $f_1$-$f_4$ are any suitable functions of ($u_1, \ldots, u_m$, V, $y_1, \ldots, y_n$) that determine values for L(i), p(i), energy(i), and ECD(i), as desired. If the input values produced at step 308 do not satisfy the constraints, other cost-function-minimizing input values that do satisfy the constraints must be determined.

Of the set of input values $u_1 \ldots u_m$, V produced for time k ... k+N in step 308, the subset of values $u_1 \ldots u_m$ for time k is then applied to the CAA 139 so that the CAA 139 blends chemicals accordingly, and the value V for time k is applied to the pump 132 so that the pump 132 pumps fluid accordingly (step 310). The method 300 then comprises waiting for one time interval until time k+1 arrives (step 312), at which point the processing unit 146 obtains measurements $y_1 \ldots y_n$ (e.g., density and viscosity) from the fluid measurement devices 152, 154. The method 300 then includes updating the predictive model (step 316). The processing unit 146 updates the predictive model in one or more ways. In some embodiments, the processing unit 146 compares the actual measurements for $y_1 \ldots y_n$ obtained at time k+1 at step 314 to the predicted measurements for $y_1 \ldots y_n$ calculated using the predictive model at time k+1 at step 308. The differences between the actual and predicted measurements is used to adjust the transfer functions $G_{11} \ldots G_{nm}$ in the predictive model (equation (1)). In such embodiments, a similar updating technique is performed for the transfer functions $G_{1V} \ldots G_{nV}$. In another updating technique that may be used independently of or in combination with the above-described updating technique, the processing unit 146 uses the measured and predicted values to adjust the initial conditions for the transfer functions $G_{11} \ldots G_{nm}$. Merely as an illustration, if a particular measured value is 1.0 and the predicted value is 0.50, the initial condition for a corresponding transfer function may be an average of the two values—that is, 0.75. If the measured value is trusted more than the predicted value, the initial condition may be adjusted to 1.0 or a value close to 1.0. Conversely, if the predicted value is trusted more than the measured value, the initial condition may be adjusted to 0.50 or a value close to 0.50. Generally, this process may be guided by the experience of a human designer or by the Kalman filtering theory. Any and all such updating techniques and variations thereupon fall within the scope of this disclosure.

Once the predictive model has been updated (step 316), control of the method 300 passes to step 308, and the process is repeated. When the cost function is calculated during a second iteration of the method 300, a total of N calculations are performed for times k+1 ... k+N+1. That is, irrespective of the starting time i for the summation performed during calculation of the cost function, a total of N calculations are performed, because the depth of the borehole 112 is continuously increasing as the drill bit 126 penetrates the formation.

As explained above, the setpoint values for the cost function are determined at step 306. The technique by which the setpoints are determined is now described. Specifically, the technique is similar to that used with respect to the predictive model (equation (1)) and cost function (equation (2)) above, with the exception that transient values are omitted and numerical values (e.g., steady state gain values) are used in lieu of transfer functions. Constraints also may be imposed. Thus, a cost function, steady-state predictive model and constraints are used in tandem to determine setpoints that are subsequently used in the cost function described above (equation (2)). An illustrative cost function may be as follows:

$$\min[-W_7 \cdot \text{eff} - W_8 \cdot \text{bit}_{clean} + W_9 \cdot \text{erosion} + W_{10} \cdot \text{kick}(i) + W_{11} \cdot \text{env}(i)] \quad (3)$$

where eff is the chip removal efficiency, $\text{bit}_{clean}$ is the bit cleaning capability by fluid, erosion is the degree of erosion, kick(i) is the degree of kickback, and env(i) is the degree of environmental impact. Other cost functions also are contemplated. The cost function (equation (3)) is subject to a predictive model and various constraints that can be described as follows:

$$\begin{bmatrix} y_{1,sp} \\ \vdots \\ y_{n,sp} \end{bmatrix} = \begin{bmatrix} \overline{G_{11}} & \cdots & \overline{G_{1m}} \overline{G_{1V}} \\ \vdots & \ddots & \vdots \\ \overline{G_{n1}} & \cdots & \overline{G_{nm}} \overline{G_{nV}} \end{bmatrix} \begin{bmatrix} u_{1,sp} \\ \vdots \\ u_{m,sp} \\ V_{sp} \end{bmatrix} \quad (4)$$

$$\mathit{eff} = \overline{f_5}(u_{1,sp}, \ldots, u_{m,sp}, V_{sp}, y_{1,sp}, \ldots, y_{n,sp})$$

$$\mathit{bit}_{clean} = \overline{f_6}(u_{1,sp}, \ldots, u_{m,sp}, V_{sp}, y_{1,sp}, \ldots, y_{n,sp})$$

$$\mathit{erosion} = \overline{f_7}(u_{1,sp}, \ldots, u_{m,sp}, V_{sp}, y_{1,sp}, \ldots, y_{n,sp})$$

$$\mathit{kick} = \overline{f_8}(u_{1,sp}, \ldots, u_{m,sp}, V_{sp}, y_{1,sp}, \ldots, y_{n,sp})$$

$$\mathit{env} = \overline{f_9}(u_{1,sp}, \ldots, u_{m,sp}, V_{sp}, y_{1,sp}, \ldots, y_{n,sp})$$

$$0 \leq u_{1,sp} \leq u_{1,max}$$

$$\vdots$$

$$0 \leq u_{m,sp} \leq u_{m,max}$$

$$0 \leq V \leq V_{max}$$

where a variable with a sp subscript denotes that variable's setpoint value, a model or function with a bar denotes its steady state gain, and $\overline{f_5}$-$\overline{f_9}$ are suitably designed functions for determining the corresponding cost function terms, as desired. Using equations (3) and (4) above, a set of setpoints $u_{1,sp}, \ldots, u_{m,sp}, V_{sp}, y_{1,sp}, \ldots, y_{n,sp}$ may be determined that minimizes the cost function (equation (3)) and satisfies the constraints and the predictive model (equation (4)). Those setpoints are subsequently used in relation to the predictive model (equation (1)), cost function (equation (2)) and related constraints, as described above.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

Various embodiments are disclosed herein. At least some embodiments are directed to a method for controlling drilling fluid properties, comprising: determining a predictive model for a fluid circulation system that routes drilling fluid downhole to a drill bit to remove debris from said drill bit; determining a cost function associated with the fluid circulation system; using the predictive model and the cost function to determine a set of input values for the predictive model; operating a controlled device according to at least some of the set of input values, said controlled device changes properties of the drilling fluid in the fluid circulation system; obtaining measurements of said properties; and updating the predictive model based on said obtained measurements. Numerous variations of such embodiments are contemplated, and they include the following concepts or steps, in any sequence and in any combination: wherein the input values for the predictive model include: quantities of chemicals to be added to the drilling fluid, and a pump rate at which the drilling fluid is to be pumped in the fluid circulation system; wherein using the predictive model and the cost function to determine the set of input values comprises determining a set of input values that causes the predictive model to produce output values that minimize the cost function; wherein the cost function comprises a summation of a plurality of calculations, each calculation associated with a different time k, at least one of said calculations comprising measured viscosity and density values for the drilling fluid, and one or more of said calculations comprising calculated viscosity and density values for the drilling fluid; wherein the cost function accounts for parameters selected from the group consisting of: drilling fluid density and viscosity measurements, setpoints for said drilling fluid density and viscosity measurements, energy consumption, equivalent circulating density, and a setpoint for said equivalent circulating density; wherein the predictive model describes a relationship between quantities of chemicals added to the drilling fluid, a pump rate at which the drilling fluid is pumped, and actual or predicted measurements of density and viscosity of the drilling fluid; wherein the predictive model describes said relationship using a matrix of dynamic transfer functions; further comprising updating the predictive model based on said obtained measurements by adjusting a transfer function used to describe said relationship; further comprising updating the predictive model based on said obtained measurements by using one or more of said measurements of the properties to adjust an initial condition associated with a differential equation transfer function used to describe said relationship; wherein the controlled device comprises a chemical additive apparatus; and wherein the properties include drilling fluid viscosity and density.

At least some embodiments are directed to a system to control drilling fluid properties, comprising: a measurement device to determine drilling fluid properties in a fluid circulation system; a processor that determines input values to a predictive model using the predictive model and a cost function, wherein the predictive model and cost function are associated with the fluid circulation system; and a controlled device that adjusts parameters associated with the fluid circulation system based on said input values, wherein the measurement device determines new drilling fluid properties after said adjustment, and wherein the processor updates the predictive model using said new drilling fluid properties. Numerous variations of such embodiments are contemplated, and they include the following concepts or steps, in any sequence and in any combination: wherein the processor determines said input values by using the input values in tandem with the predictive model to produce output values that minimize the cost function; wherein the cost function accounts for multiple parameters associated with the fluid circulation system, and wherein one or more operations performed using one or more of said multiple parameters is weighted; wherein the processor increases a weight applied to an operation that has a result exceeding a predetermined threshold; wherein the processor decreases a weight applied to an operation that has a result within a predetermined range; wherein the processor increases a weight applied to an operation involving an equivalent circulating density measurement and an equivalent circulating density setpoint when a difference between a pore pressure gradient and a fracture pressure gradient is less than a predetermined threshold; wherein the processor further determines the input values using a set of constraints pertaining to one or more of: parameters used in the cost function, values used in the predictive model, a predicted fluid tank level, and a pipeline pressure; wherein the cost function accounts for parameter setpoints, and wherein the processor determines the setpoints using a setpoint cost function associated with the fluid circulation system and a setpoint predictive model associated with the fluid circulation system; and wherein said controlled device comprises a chemical additive apparatus, and wherein said parameters associated with the fluid circulation system include the rates at which multiple chemicals are added to said drilling fluid in the fluid circulation system.

What is claimed is:

1. A method for controlling drilling fluid properties, comprising:
    determining a predictive model for a fluid circulation system that routes drilling fluid downhole to a drill bit to remove debris from said drill bit, wherein the predictive model is a dynamic model that is a function of the time delay between an addition of one or more substances to the drilling fluid and a change of one or more properties of the drilling fluid in response to the addition of the one or more substances to the drilling fluid;
    determining a cost function associated with the fluid circulation system wherein said cost function accounts for multiple parameters associated with the fluid circulation system, and wherein one or more operations performed using one or more of said multiple parameters is weighted;
        wherein the weight applied to an operation involving an equivalent circulating density measurement and an equivalent circulating density setpoint are increased when a difference between a pore pressure gradient and a fracture pressure gradient is less than a predetermined threshold;
    using the predictive model and the cost function to determine a set of input values for the predictive model by using the input values in tandem with the predictive model to produce output values that minimize the cost function;
    operating a controlled device according to at least some of the set of input values, said controlled device changes properties of the drilling fluid in the fluid circulation system; and
    obtaining measurements of said properties.

2. The method of claim 1, wherein the input values for the predictive model include:
    quantities of chemicals to be added to the drilling fluid; and
    a pump rate at which the drilling fluid is to be pumped in the fluid circulation system.

3. The method of claim 1, wherein the cost function comprises a summation of a plurality of calculations, each calculation associated with a different time k, at least one of said calculations comprising measured viscosity and density values for the drilling fluid, and one or more of said calculations comprising calculated viscosity and density values for the drilling fluid.

4. The method of claim 1, wherein the cost function accounts for parameters selected from the group consisting of:
    drilling fluid density and viscosity measurements;
    setpoints for said drilling fluid density and viscosity measurements;
    energy consumption;
    equivalent circulating density; and
    a setpoint for said equivalent circulating density.

5. The method of claim 1, wherein the predictive model describes a relationship between quantities of chemicals added to the drilling fluid, a pump rate at which the drilling fluid is pumped, and actual or predicted measurements of density and viscosity of the drilling fluid.

6. The method of claim 5, wherein the predictive model describes said relationship using a matrix of dynamic transfer functions.

7. The method of claim 5, further comprising updating the predictive model based on said obtained measurements by adjusting a transfer function used to describe said relationship.

8. The method of claim 5, further comprising updating the predictive model based on said obtained measurements by using one or more of said measurements of the properties to adjust an initial condition associated with a differential equation transfer function used to describe said relationship.

9. The method of claim 1, wherein the controlled device comprises a chemical additive apparatus.

10. The method of claim 1, wherein the properties include drilling fluid viscosity and density.

11. A system to control drilling fluid properties, comprising:
    a measurement device to determine drilling fluid properties of drilling fluid in a fluid circulation system;
    a processor that determines input values to a predictive model using the predictive model and a cost function, wherein the predictive model and cost function are associated with the fluid circulation system, wherein the predictive model is a dynamic model that is a function of the time delay between an addition of one or more substances to the drilling fluid and a change of one or more properties of the drilling fluid in response to the addition of the one or more substances to the drilling fluid;
    wherein the processor determines said input values by using the input values in tandem with the predictive model to produce output values that minimize the cost function;
    wherein the cost function accounts for multiple parameters associated with the fluid circulation system, and wherein one or more operations performed using one or more of said multiple parameters is weighted;
        wherein the processor increases a weight applied to an operation involving an equivalent circulating density measurement and an equivalent circulating density setpoint when a difference between a pore pressure gradient and a fracture pressure gradient is less than a predetermined threshold; and
    a controlled device that adjusts parameters associated with the fluid circulation system based on said input values,
    wherein the measurement device determines new drilling fluid properties after said adjustment, and wherein the processor updates the predictive model using said new drilling fluid properties.

12. The system of claim 11, wherein the processor increases a weight applied to an operation that has a result exceeding a predetermined threshold.

13. The system of claim 11, wherein the processor decreases a weight applied to an operation that has a result within a predetermined range.

14. The system of claim 11, wherein the processor further determines the input values using a set of constraints pertaining to one or more of:
    parameters used in the cost function;
    values used in the predictive model;
    a predicted fluid tank level; and
    a pipeline pressure.

15. The system of claim 11, wherein the cost function accounts for parameter setpoints, and wherein the processor determines the setpoints using a setpoint cost function associated with the fluid circulation system and a setpoint predictive model associated with the fluid circulation system.

16. The system of claim 11, wherein said controlled device comprises a chemical additive apparatus, and wherein said parameters associated with the fluid circulation system include the rates at which multiple chemicals are added to said drilling fluid in the fluid circulation system.

* * * * *